(12) United States Patent
Nisikawa

(10) Patent No.: US 9,114,460 B2
(45) Date of Patent: Aug. 25, 2015

(54) GUIDE PAD, CUTTING TOOL BODY AND CUTTING TOOL

(71) Applicant: TUNGALOY CORPORATION, Iwaki-shi, Fukushima (JP)

(72) Inventor: Koji Nisikawa, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 274 days.

(21) Appl. No.: 13/757,831

(22) Filed: Feb. 3, 2013

(65) Prior Publication Data

US 2013/0149057 A1 Jun. 13, 2013

Related U.S. Application Data

(63) Continuation-in-part of application No. PCT/JP2012/052734, filed on Feb. 7, 2012.

(30) Foreign Application Priority Data

Feb. 28, 2011 (JP) .................................. 2011-041847

(51) Int. Cl.
   *B23B 51/00* (2006.01)
   *B23B 51/04* (2006.01)

(52) U.S. Cl.
   CPC ........... *B23B 51/0054* (2013.01); *B23B 51/048* (2013.01); *B23B 2200/00* (2013.01); *B23B 2200/04* (2013.01); *B23B 2200/0447* (2013.01); *B23B 2251/56* (2013.01);
   (Continued)

(58) Field of Classification Search
   CPC ............ B23B 2200/04; B23B 2200/00; B23B 2200/43; B23B 2200/0447

USPC ........................................ 408/81, 83; 407/113
   See application file for complete search history.

(56) References Cited

U.S. PATENT DOCUMENTS

| 3,751,177 A | 8/1973 | Faber |
| 5,697,737 A | 12/1997 | Danielsson et al. |
| 7,448,832 B2 * | 11/2008 | Annanolli et al. ............... 408/81 |

(Continued)

FOREIGN PATENT DOCUMENTS

| EP | 2239076 A1 * | 10/2010 |
| JP | 2003-211311 A | 7/2003 |

(Continued)

OTHER PUBLICATIONS

International Preliminary Report on Patentability (IPRP) dated Sep. 3, 2013 issued in PCT counterpart application (No. PCT/JP2012/052734).

(Continued)

*Primary Examiner* — Eric A Gates
*Assistant Examiner* — Paul M Janeski
(74) *Attorney, Agent, or Firm* — Womble Carlyle

(57) ABSTRACT

A guide pad with high flexibility of arrangement is provided. The guide pad in a plate-like shape is provided, including an upper surface and a lower surface which face each other, and a side surface extending between the upper surface and the lower surface, and being removably attached to a tool body of a cutting tool, in which the upper surface includes at least one guide surface that extends in a longitudinal direction of the guide pad and curves convexly, and the upper surface and the lower surface have left-right asymmetrical external shapes, respectively.

20 Claims, 11 Drawing Sheets

(52) U.S. Cl.
CPC ......... *Y10T 407/23* (2015.01); *Y10T 408/5586* (2015.01); *Y10T 408/98* (2015.01)

(56) References Cited

U.S. PATENT DOCUMENTS

2007/0092347 A1\* 4/2007 Ananolli .................. 408/81
2010/0040425 A1   2/2010 Nomura et al.
2010/0061817 A1\* 3/2010 Nomura et al. ............ 408/83

FOREIGN PATENT DOCUMENTS

JP   2005-246528 A   9/2005
JP   2006-239827 A   9/2006

OTHER PUBLICATIONS

International Search Report and Written Opinion dated Apr. 10, 2012 issued in PCT counterpart application (No. PCT/JP2012/052734).

\* cited by examiner

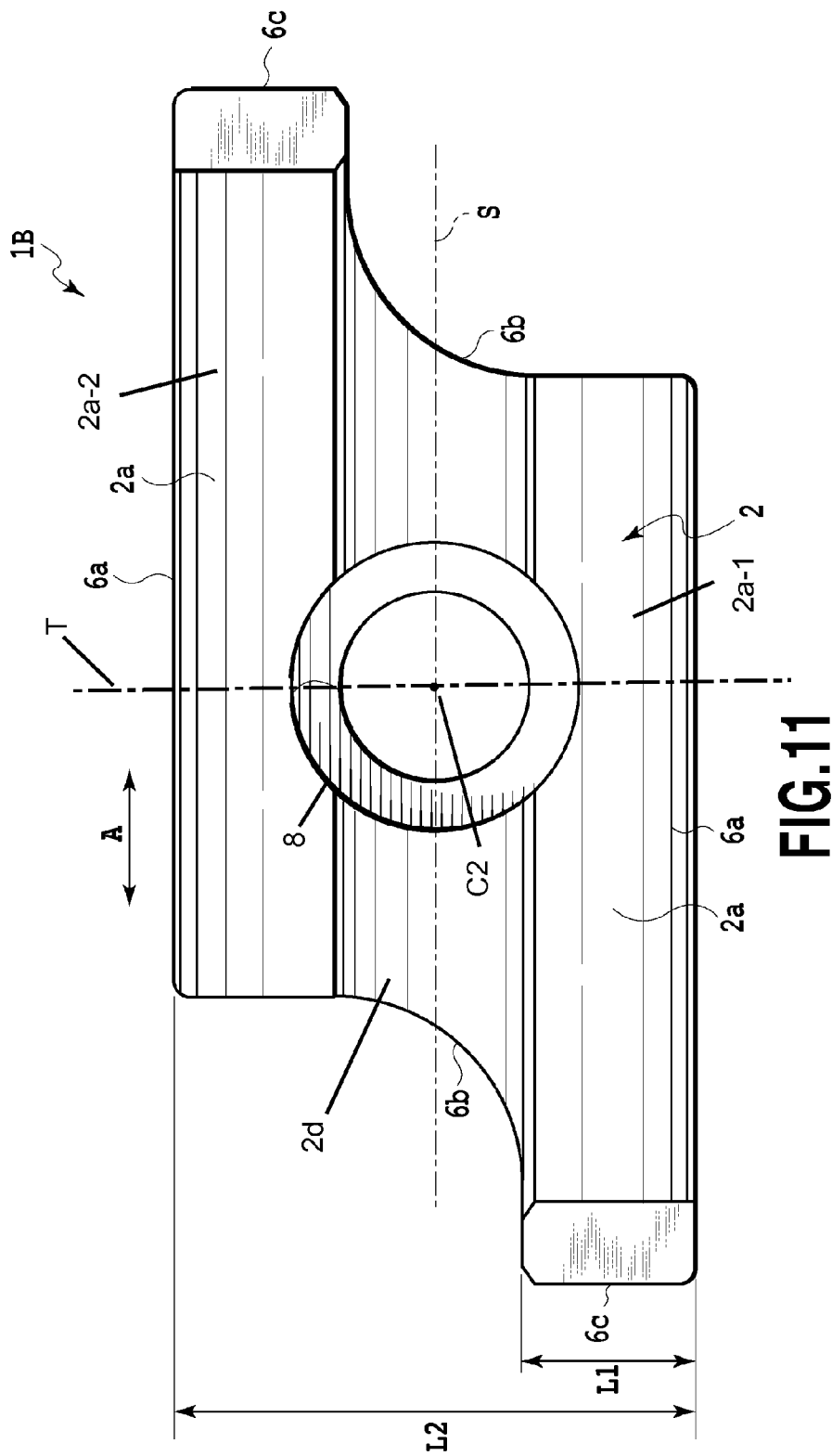

GUIDE PAD, CUTTING TOOL BODY AND CUTTING TOOL

CROSS-REFERENCE TO RELATED APPLICATIONS

This application is a continuation-in-part of PCT application No. PCT/JP2012/052734 filed Feb. 7, 2012 and published as WO 2012/117813A1, which claims the benefit of Japanese Patent Application 2011-041847, filed on Feb. 28, 2011. The contents of the above-identified applications are incorporated by reference in their entirety.

BACKGROUND OF THE INVENTION

1. Field of the Invention

The present invention relates to a guide pad removably attached to a cutting tool for supporting the cutting tool, a cutting tool body to which the guide pad is attached, and the cutting tool having the guide pad attached thereto.

2. Description of the Related Art

As a conventional guide pad, there is one disclosed in Japanese Patent Laid-Open No. 2003-211311. The guide pad disclosed in Japanese Patent Laid-Open No. 2003-211311 is mounted at an outer circumference of a leading end of a drill head mainly used for deep hole cutting, and abuts on a machining hole machined by the drill, thereby supporting the drill itself. The aforementioned guide pad is removably attached to the drill. The guide pad has a plate-like shape of a substantially rectangular external shape and has a mounting hole formed at the center in a longitudinal direction, and two curved surfaces that are formed on both sides of the mounting hole in a longitudinal direction, and abut on the machining hole as guide surfaces, each having a substantially arc-shaped cross-section. The guide pad includes a guide surface part formed of a cemented carbide, and a steel material part to which the guide surface is brazed and which has a mounting hole to the tool body. That is, the guide pad includes the steel and the brazing materials. The guide pad is formed to have an attachment base portion of the steel material with a substantially L-like cross-section for suppressing generation of cracks in the cemented carbide owing to difference in thermal stress upon brazing of the cemented carbide and the steel material.

Further, as a conventional guide pad, there is one disclosed in International Application Publication No. 96/008332. The guide pad disclosed in International Application Publication No. 96/008332 is formed into a plate-like shape with a substantially rectangular external shape, and has wing-shaped protrusions extending from two long sides thereof, respectively. As the guide pad is entirely formed of the cemented carbide material, the wing-shaped protrusions are provided to prevent reduction in a thickness of the wall from the mounting hole to the outer circumferential side surface for securing the strength of the area around the mounting hole.

In a cutting tool with a single cutting edge for drilling a hole, generally, it is preferable to provide a guide pad at two positions: a 180° position around an axis of rotation with respect to the cutting edge; and a 90° position backward in a relative rotating direction of the tool with respect to the cutting edge, when seen from the leading end side of the tool. In other words, it is preferable to provide it at the farthest position from the cutting edge, and at the position that receives a principal component as the largest among three components of cutting force. However, when the tool diameter that defines the machining hole diameter is relatively small, it is sometimes difficult to provide the guide pad at such preferable positions.

A main reason thereof is interference of a cutting insert or a fastening mechanical part for the cutting insert with the guide pad. Therefore, it is preferable to use the guide pad having no interference, specifically having interference as small as possible, with the other components. However, the wall around the mounting hole is required to have sufficient strength for fastening of the guide pad with a clamp screw and the like. As the cross section of the mounting base portion of the guide pad disclosed in Japanese Patent Laid-Open No. 2003-211311 is formed in substantially L-shape, the guide pad is formed larger in width by the substantially L-shaped wall. In other words, as the guide surface is formed of the separate member from the mounting base portion, the guide pad disclosed in Japanese Patent Laid-Open No. 2003-211311 is not suitable for reducing the size and width. The guide pad disclosed in Pamphlet of International Application Publication No. 96/008332 is entirely formed of a cemented carbide, which is suitable for reducing the size and the width. However, the wing-shape protrusions left-right symmetrically protruding from two long sides of the guide pad are likely to be interfered with the other parts.

SUMMARY OF THE INVENTION

The present invention provides a guide pad that improves flexibility of arrangement, a cutting tool body to which the guide pad is attached, and a cutting tool having the guide pad attached thereto.

The guide pad according to the present invention has a plate-like shape and includes opposite upper and lower surfaces; and a side surface extending between the upper surface and the lower surface, wherein the upper surface includes at least one guide surface that extends in a longitudinal direction of the guide pad and curves convexly; and the upper and lower surfaces have left-right asymmetrical external shapes, respectively.

The cutting tool according to the present invention includes the above-described guide pad and the tool body to which the guide pad is removably attached.

The cutting tool body according to the present invention includes a pad seat that allows reception of the above-described guide pad.

The guide pad according to the present invention is formed such that the external shapes of the upper and lower surfaces are left-right asymmetrical, that is, there is no axis of symmetry in any direction. Therefore, the guide pad may be formed to have a shape that never causes interference in accordance with the arrangement on the tool body. This makes it possible to improve flexibility of the guide pad arrangement.

Further features of the present invention will become apparent from the following description of exemplary embodiments, with reference to the attached drawings.

BRIEF DESCRIPTION OF THE DRAWINGS

FIG. 11 is a plan view of the guide pad shown in FIG. 10.

DETAILED DESCRIPTION

Figure 1:
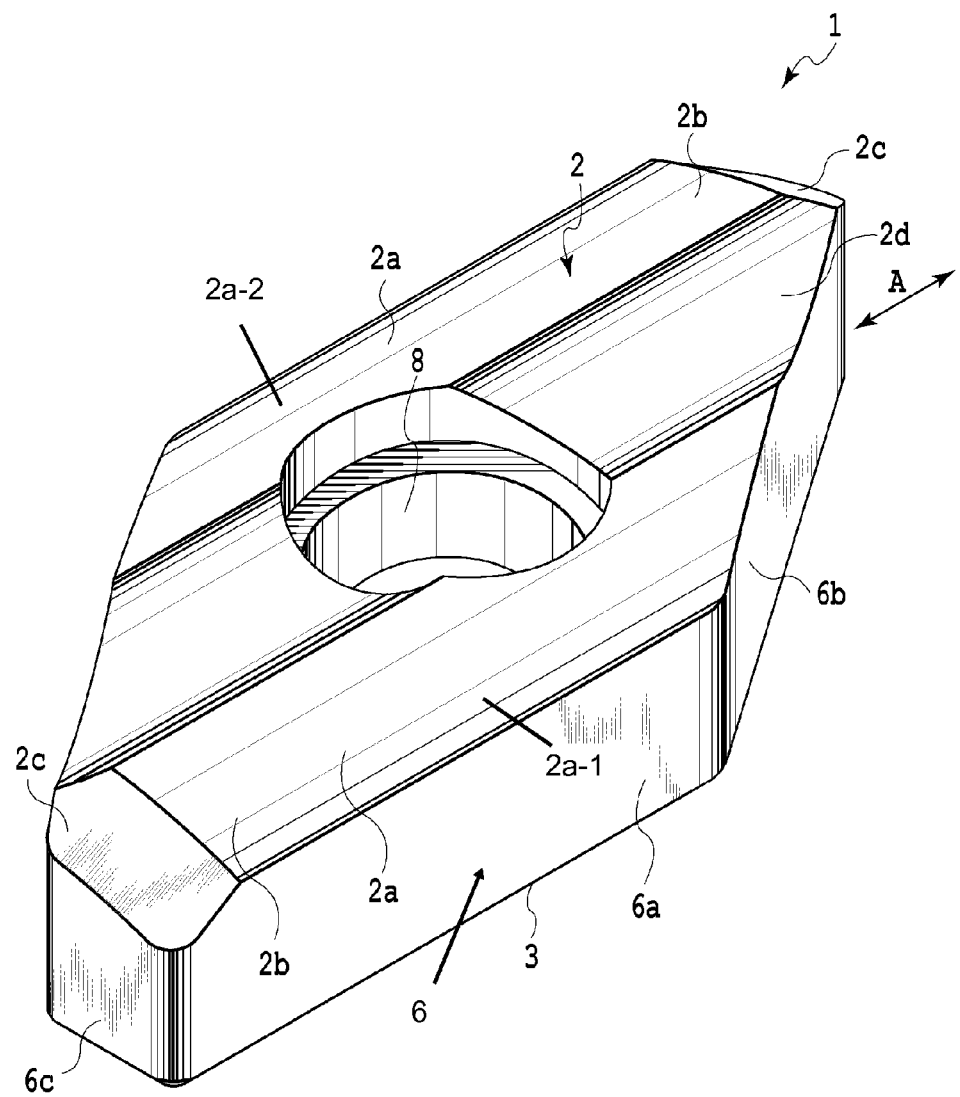
FIG. 1 is a perspective view of a guide pad according to a first embodiment.

Embodiments according to the present invention will be described referring to the drawings.

First Embodiment

As shown in FIGS. 1 to 4, a guide pad 1 according to the first embodiment has a flat-plate shape and includes an upper surface 2 and a lower surface 3 facing each other, and a peripheral side surface 6 comprising a plurality of side surfaces 6a, 6b and 6c extending between the upper surface 2 and the lower surface 3. Each external shape of the upper surface 2 and the lower surface 3 is substantially parallelogrammatic. The external shapes of the upper surface 2 and the lower surface 3 have truncated acute-angled corners, and so in the plan view of FIG. 2 the guide pad 1 may be seen as a substantially hexagonal shape. Since the guide pad 1 is not used for cutting, it is devoid of cutting edges, such as at the intersections of the upper surface and the side surfaces. Also, the upper and lower surfaces differ from one another, and so the guide pad is not reversible.

Among the plurality of side surfaces 6a, 6b and 6c belonging to the peripheral side surface 6, the two opposing major side surfaces 6a, 6a extending along a longitudinal direction A are substantially formed of planar surfaces and are arranged substantially in parallel with each other. The two connecting side surfaces 6b, 6b are also substantially formed of planar surfaces and are arranged substantially in parallel with each other. The two opposing lateral side surfaces 6c, 6c are also substantially formed of planar surfaces and are arranged substantially in parallel with each other. As seen in the plan view of FIG. 2, the connecting side surfaces 6b, 6b which connect the major side surfaces 6a, 6a to the lateral side surfaces 6c, 6c are substantially straight (being planar), thus giving the guide pad 1 its substantially hexagonal shape. The lower surface 3 is substantially planar. The structure of the upper surface 2 will be described later.

Figure 5:
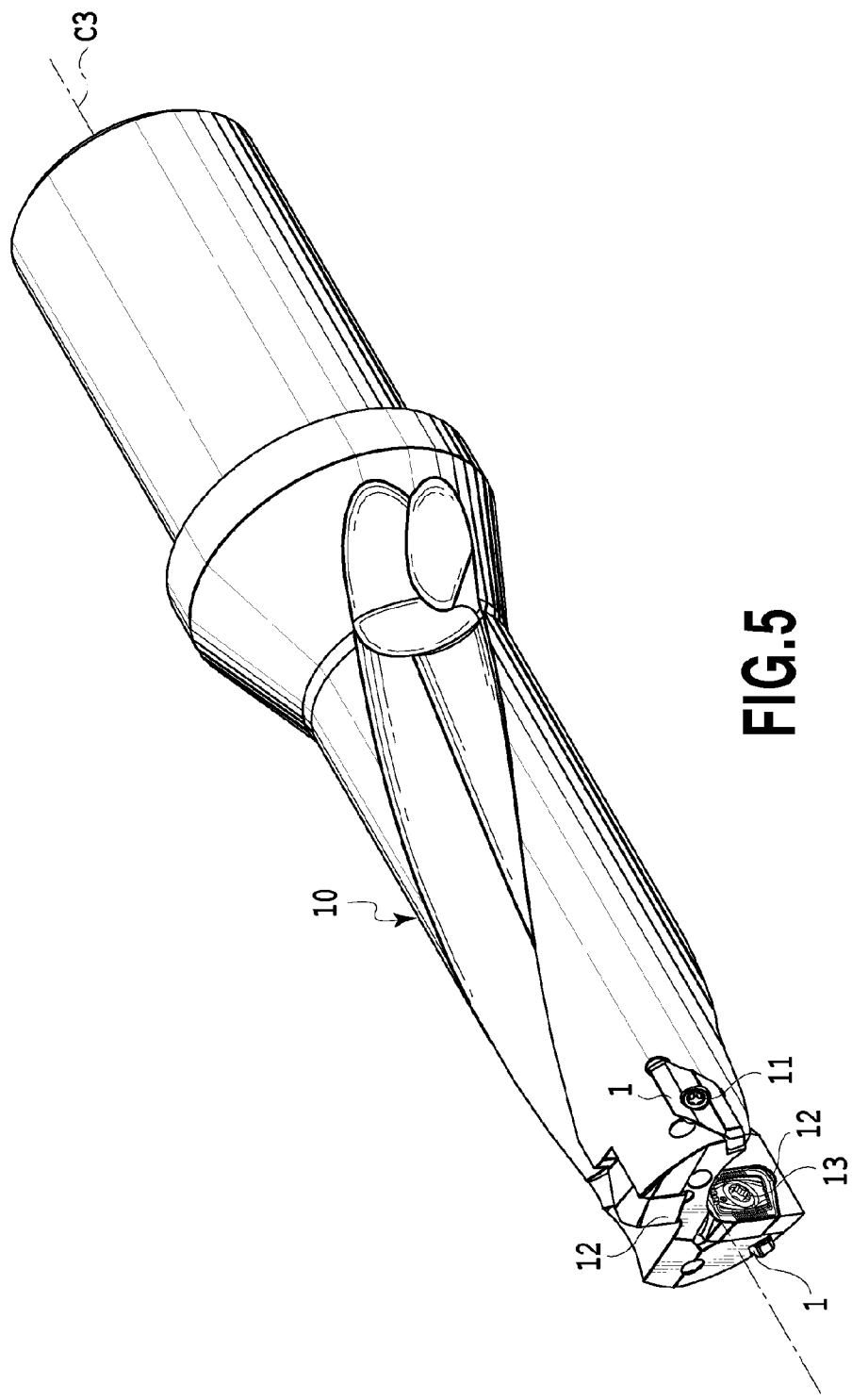
FIG. 5 is a perspective view of a rotary cutting tool with the guide pad attached thereto according to an embodiment.
Figure 6:
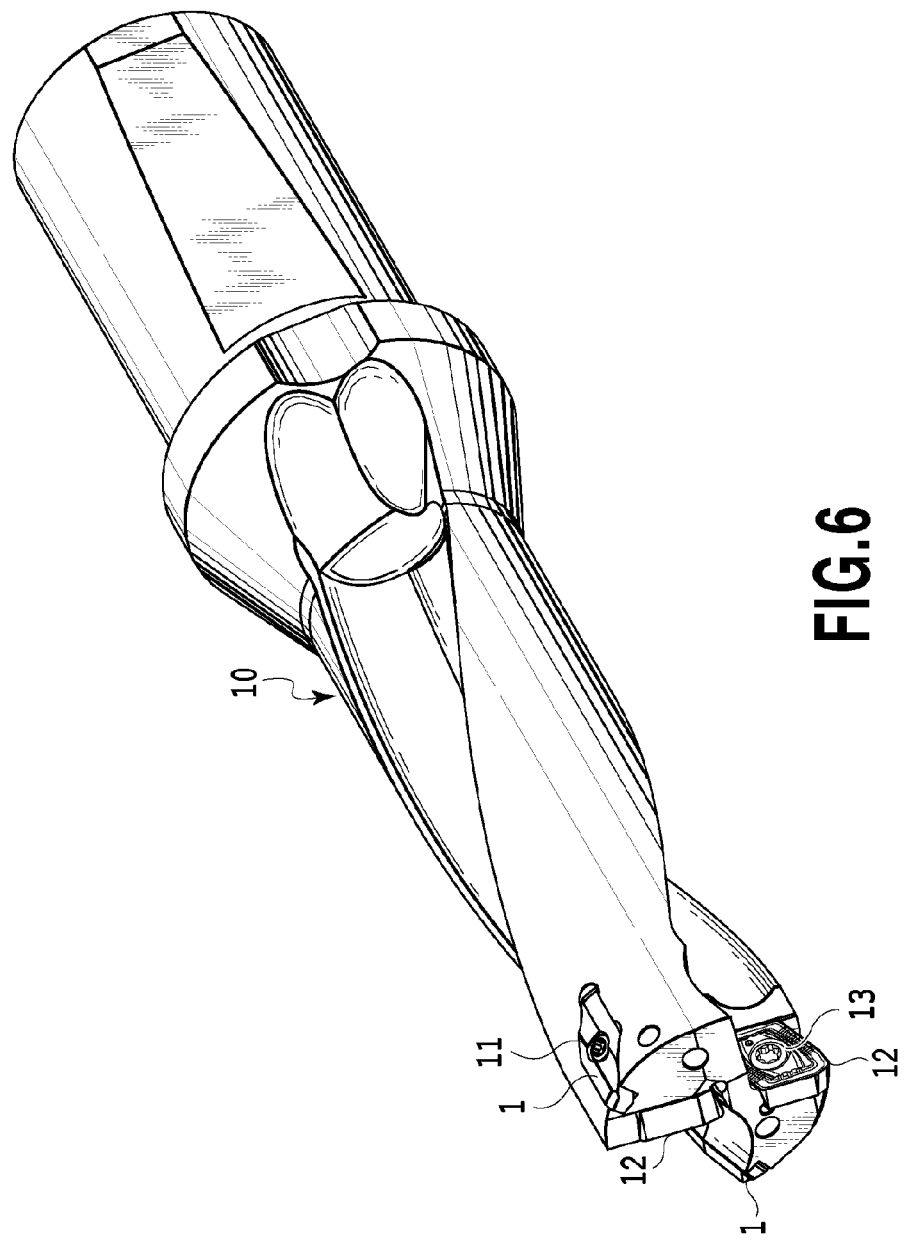
FIG. 6 is a perspective view of the cutting tool shown in FIG. 5 when seen from another direction.

The guide pad 1 is removably attachable to a tool body 10 of a rotary cutting tool as an indexable drill as shown in FIGS. 5 and 6, for example. A guide surface 2a is formed on the upper surface 2 and has two guide surface sections 2a-1, 2a-2 separated from one another by a longitudinally extending recess groove 2d. Each guide surface section has a first end 2b proximate to a lateral side surface 6c and an opposite end 2e proximate to a connecting side surface 6b. Each section 2a-1, 2a-2 has an end 2b close to a corresponding lateral side 6c. The guide surface 2a is formed as a curved surface with a curvature radius R having a substantially arc-like cross-section, and extends in the longitudinal direction A. The guide surface 2a is partially in contact with an inner wall surface of a machining hole to be machined by the drill, and operates so as to support the drill. This operation guides the drill to the machining hole and improves straightness of the drill. During a drilling operation, a portion of the guide surface 2a around one end 2b located on the leading end side of the drill is positioned so as to be in contact with the inner wall surface of the machining hole. That is, the guide pad 1 is placed while being slightly tilted so that the portion of the guide surface 2a other than the area around the end 2b on one side is free from contact. The removable attachment of the guide pad 1 to the cutting tool indicates easy replacement in such a case as fixing of the guide pad 1 with a clamp screw 11 and the like, for example. The method of attaching the guide pad 1 is not limited to the use of the clamp screw 11, but various known attaching methods may be employed.

Figure 7:
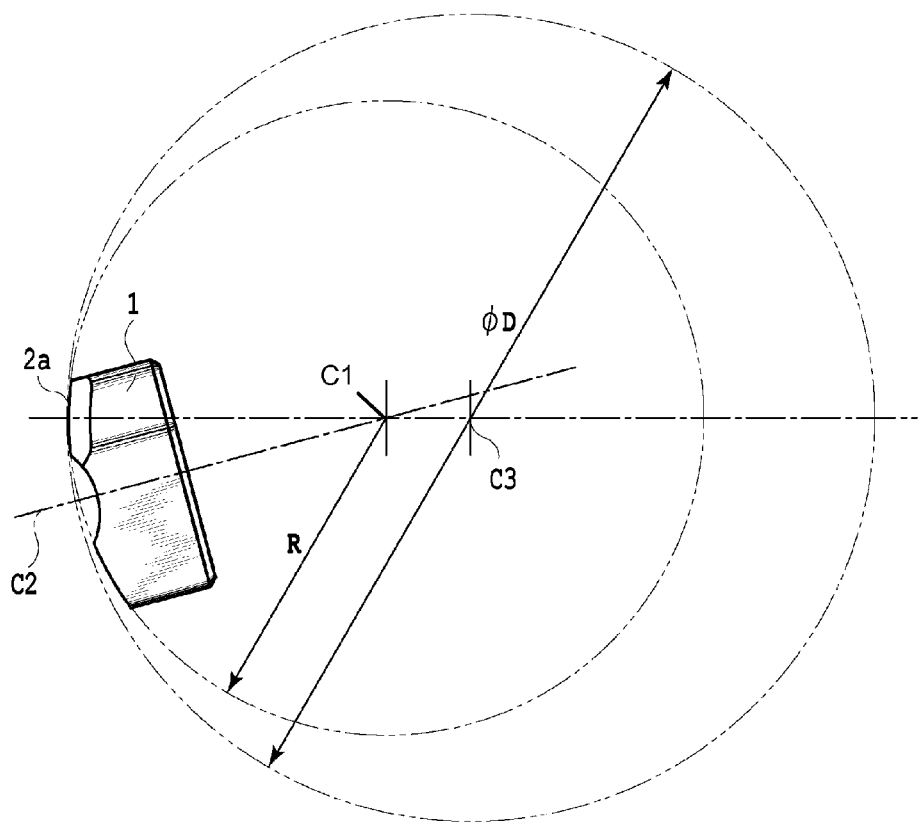
FIG. 7 is a schematic view illustrating how to use the guide pad.

The specific shape of the guide surface 2a is defined by its curvature radius R which is smaller than half of a diameter $\phi D$ of a guide hole. The guide hole herein denotes the hole through which the guide pad is guided, like the aforementioned machining hole. For example, when the guide pad 1 is used in the indexable drill with the guide hole diameter substantially equal to the machining hole diameter, and is guided to the machining hole to be machined by the drill, preferably, the curvature radius of a substantially arc-like shape that constitutes the guide surface 2a with the arc-like cross-section is set to the value smaller than the half (radius) of the diameter $\phi D$ of the machining hole to be machined by the guide pad 1. FIG. 7 schematically represents the relationship between the curvature radius R of the guide surface 2a and the diameter $\phi D$ of the machining hole. That is, the relationship between the curvature radius R and the diameter $\phi D$ is expressed as $R < (\phi D / 2)$.

If the curvature radius R is larger than the half of the diameter $\phi D$ of the machining hole, the guide surface 2a is not brought into contact with the machining hole to be formed as the guide hole. It fails to provide the guide function, and an edge is brought into contact with the machining hole. Contact of the edge of the guide surface 2a with the inner wall surface of the machining hole may damage the inner wall surface of the machining hole.

Figure 4:
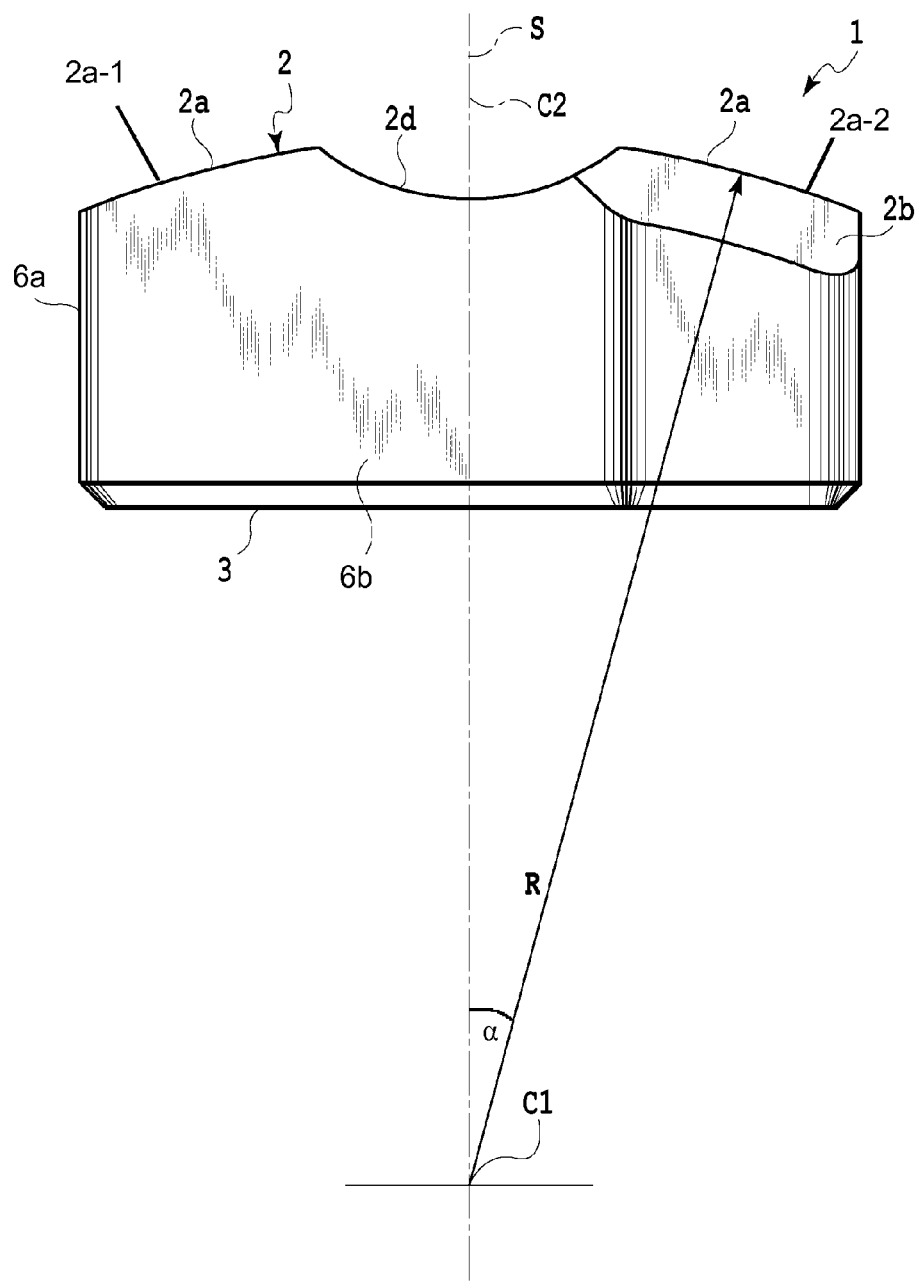
FIG. 4 is a right side view of the guide pad shown in FIG. 2.

The guide surface 2a according to the embodiment has the constant curvature radius R. For example, if the guide pad 1 is attached to the indexable drill with the machining diameter $\phi D$ set to approximately 32 mm, the curvature radius R of the guide surface 2a may be set to approximately 15.0 mm. In the embodiment, as the curvature radius R of the guide surface 2a is kept constant, the center of the curvature of the guide surface 2a is located on an axis line C1 as shown in FIG. 4. The axis line C1 is a straight line that extends in a vertical direction with respect to the drawing of FIG. 4 (perpendicular to the sheet) and is parallel to the lower surface 3. Note that, the embodiment will be explained with respect to the case where the curvature radius R is kept constant, but, the present invention is not limited to the aforementioned case. For example, the present invention may be applied to a case that the curvature radius R of the guide surface 2a changes in the longitudinal direction A (i.e., R changes along axis line C1), and also to a case that the curvature of an arc changes in accordance with the position on the arc (i.e., R changes as function of an angle a about axis line C1, and so a curvature of the guide surface 2a changes in accordance with distance from the reference plane S, described below).

Figure 2:
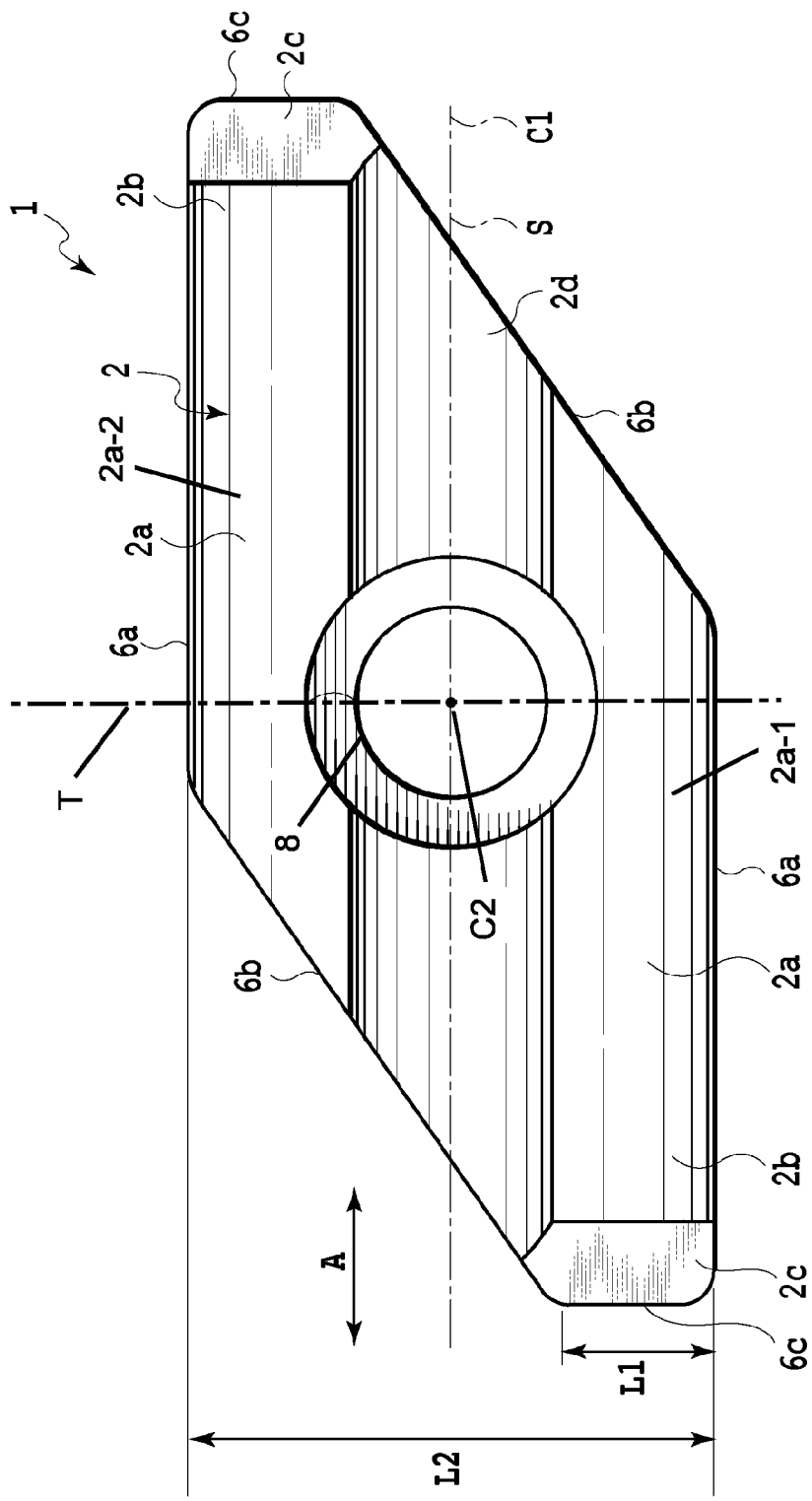
FIG. 2 is a plan view of the guide pad shown in FIG. 1.
Figure 3:
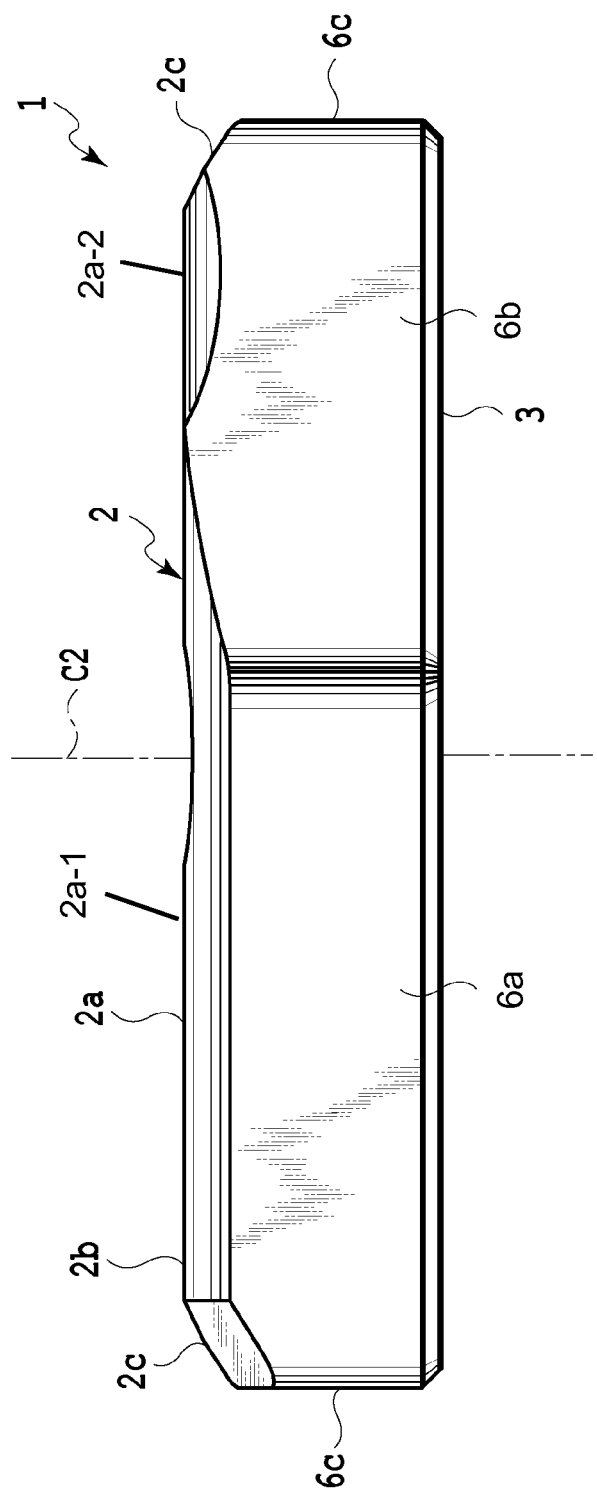
FIG. 3 is a front view of the guide pad shown in FIG. 2.

As shown in FIG. 2, the guide pad 1 has a single mounting hole 8 formed that penetrates the upper surface 2 and the lower surface 3. The guide pad 1 is formed 180° rotationally symmetrical with respect to a central axis line C2 of the mounting hole 8. The central axis line C2 intersects the axis line C1. Assuming that the plane which contains the axis line C1 and passes the center between the two side surfaces 6a, 6a is set as a reference plane S, the reference plane S substantially bisects the guide pad 1. A transverse plane T which may intersect both of the major side surfaces 6a, 6a at right angles is perpendicular to the reference plane S, and intersects the reference plane S at the central axis line C2 about which the guide pad has 180° rotational symmetry. As is known from FIG. 2, the external shapes of the upper surface 2 and the lower surface 3 of the guide pad 1 are formed to be asymmetrical with respect to the reference plane S. In other words, the upper surface 2 and the lower surface 3 have left-right asymmetrical external shapes. The external shapes of the upper surface 2 and the lower surface 3 of the guide pad 1 are also formed to be asymmetrical with respect to the transverse plane T. In other words, the upper surface 2 and the lower surface 3 also have top-bottom asymmetrical external shapes. In other words, the guide surface 2a is not minor-symmetric with respect to either the reference plane S or the transverse plane T, though the guide surface it has rotational symmetry about the intersection (designated by central axis line C2) of the reference plane S and the transverse plane T.

Each width L1 of the guide pad 1 at both ends in the longitudinal direction A (i.e., at the lateral side surfaces 6c, 6c) is smaller than the width at the position of the central axis line C2, that is, the width L2 between the two major side surfaces 6a, 6a. The guide pad 1 has the maximum width L2 at the area around which the mounting hole 8 is formed, and the width L2 gradually decreases toward both ends in the longitudinal direction A. Then each width at both ends in the longitudinal direction A becomes the minimum width L1. Respective ends in the longitudinal direction A (at the lateral side surfaces 6c, 6c) are offset toward the respective side surfaces 6a from the reference plane S.

In the embodiment, the width L1 of the respective ends of the guide pad 1 is set to approximately 2.00 mm, and the width L2 is set to approximately 6.35 mm. The width L2 may be set to the smaller value such as approximately 5.56 mm. The width is not specifically limited so long as it allows removable attachment to the tool body 10 of the cutting tool. In the embodiment, the angle of the acute-angled corner of the substantially parallelogram external shape of the guide pad 1 is set to approximately 35.0°, which is not limited thereto. The angle of the acute-angled corner of the guide pad 1 may be arbitrarily adjusted so long as it does not interfere with the other components of the cutting tool to which the guide pad is attached, and the overall dimension is reduced while keeping the strength. For example, the angle of the acute-angled corner may be set to approximately 55.0°.

In the embodiment, a clamp screw 13 for a cutting insert 12 is employed as the fastening member for attachment of the cutting insert 12 to the tool body 10. The guide pad 1 is designed to be shaped so as not to interfere with the clamp screw 13 for the cutting insert 12, and a prepared hole for the screw. The fastening member for the cutting insert 12 is not limited to the clamp screw 13, but various types of equivalent devices may be applied. Any fastening method may be employed so long as the guide pad 1 is arranged so as to avoid the interference with all the parts.

The width of the guide pad 1 is appropriately adjusted so that the head of the clamp screw 11 does not protrude from the guide surface 2a, and the strength of the guide pad 1 for clamping is intensified. The largest width of the guide pad 1 according to the embodiment is set to approximately 3 mm. Chamfers 2c are formed at both ends of the upper surface 2 of the guide pad 1 in the longitudinal direction A, proximate the lateral side surfaces 6c. The chamfer 2c prevents the guide pad 1 from damaging the inner wall surface of the machining hole, and from causing an abnormal damage such as chipping. The guide surface 2a is arranged so as to secure a clearance between the inner wall surface of the machining hole and the guide surface 2a at the chamfer 2c and also in areas toward the mounting hole 8, and to allow the ends 2b around the chamfers 2c to perform the guide function.

As known from FIGS. 1, 2 and 4, the guide pad 1 according to the embodiment has a guide surface 2a comprising the two separate guide surface sections 2a-1, 2a—formed on opposite sides of the reference plane S. However, as can be understood from FIG. 7, only one of the two guide surface sections is operative at any given time, the other guide surface section being relieved from the machining hole.

If there are two guide surface sections 2a-1, 2a-2 as described above, for example, when one of the two guide surface sections is damaged in use, the other guide surface section that is not damaged may be used. In other words, even if one of the guide surface sections is damaged, it is possible to prevent the other guide surface section from being simultaneously damaged.

When the guide pad 1 according to the embodiment is removably attached, as shown in FIG. 7, at least the central axis line C2 of the mounting hole 8 is offset with respect to the tool axis of rotation C3 so as not to intersect the tool axis of rotation C3 of the cutting tool. That is, the guide pad 1 is arranged tilted so that the central axis line C2 does not intersect the central axis line C3 of the machining hole. The aforementioned arrangement brings one of the two guide surface sections 2a-1, 2a-2 into reliable contact with the inner wall surface of the machining hole, and secures the sufficient clearance between the other guide surface section 2a-2, 2a-1 and the inner wall surface of the machining hole. This makes it possible to more reliably prevent the damage of the other guide surface section 2a-2, 2a-1.

The major side surfaces 6a and 6b, and the lower surface 3 of the guide pad 1 partially function as seating surfaces upon attachment to the tool body 10. A longitudinally extending recess groove 2d is formed between the two guide surface sections 2a-1, 2a,2 as shown in FIG. 4. The groove 2d of the embodiment has a relatively simple shape, which is not limited thereto. Any groove with arbitrary shape may be employed so long as the two guide surface sections 2a-1, 2a-2 are sufficiently separated. In the embodiment, each of the two guide surface sections 2a-1, 2a-2 has a curved surface with the common curvature center, which is not limited thereto. The two guide surface sections 2a-1, 2a-2 each may have the different curvature center, or different curvature radius so long as the curvature radius R of each of the guide surface sections 2a-1, 2a-2 is smaller than the half of the diameter $\phi D$ of the machining hole as described above. Such guide surface sections may be arbitrarily formed with different or variable shapes.

The guide pad 1 according to the present invention may have a body entirely formed of a single hard material such as, for example, cemented carbide, cermet, or ceramic. A hard coating may be coated on the surface of the aforementioned hard material. In other words, the steel material which may constitute the tool body and brazing material do not have to be used as the material for forming the guide pad 1 according to the present invention. This makes it possible to reduce the dimension of the guide pad 1, thus improving the flexibility of arrangement on the tool body 10.

As described above, in the embodiment, the curvature radius R of the guide surface 2a is kept constant, which is not limited thereto. The clearance between the guide pad 1 and the inner wall surface of the machining hole may be appropriately adjusted by positively changing the curvature radius R to reduce the curvature radius R as coming closer to the mounting hole 8. Joint portions of the plurality of side surfaces 6a, 6b and 6c are rounded for preventing the guide pad 1 from causing the abnormal damage such as chipping. In the embodiment, each curvature radius of all the rounded corners at 6 points may be set to approximately R0.4 mm.

In the embodiment, as described above, the guide pad 1 is formed 180° rotationally symmetrical with respect to the central axis line C2 of the mounting hole 8. Due to this, after using one of the two guide surface sections 2a-1, 2a-2, the guide pad 1 is rotated at 180° around the central axis line C2 so as to allow the use of the other guide surface section 2a-2, 2a-1. The part of the guide surface 2a that does not influence either the attachment to the tool body 10 or the guide function does not have to have the shape symmetrical with respect to the central axis line C2 of the mounting hole 8. The design may be appropriately changed within a range not to influence the support (guide) function.

Figure 8:
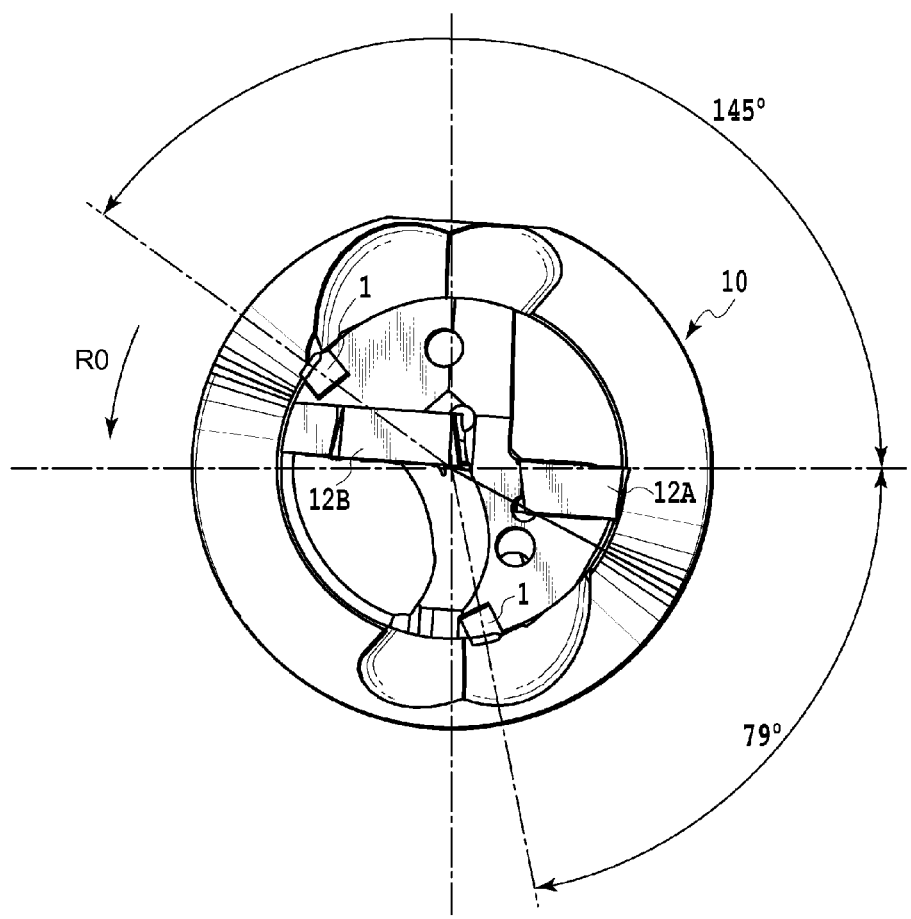
FIG. 8 is a front view of the rotary cutting tool having the guide pad shown in FIG. 5 attached thereto.

In the drill of FIG. 5, the guide pads 1 are arranged at the positions shown in FIG. 8. A cutting insert 12A for providing a peripheral cutting edge, and a cutting insert 12B for providing a center cutting edge are attached to the drill, respectively. As shown in FIG. 8, the guide pads 1 are attached to two positions, that is, an approximately 145° position forward in the relative rotating direction R0 of the tool from the cutting edge of the cutting insert 12A and an approximately 79° position backward in the relative rotating direction R0 of the tool from the cutting edge of the cutting insert 12A. As described above, for the single cutting-edge drill, the optimal positions of the guide pads are set to two points, that is, a 180° position in the relative rotating direction of the tool from the peripheral cutting edge, and a 90° position backward in the relative rotating direction of the tool from the peripheral cutting edge. In the embodiment, deviation amounts from the optimal positions may be set to approximately 35° (180°-145°) and 11° (90°-79°), respectively. If the conventional guide pads are arranged with the tool of the same type, the respective deviation amounts of approximately 48° and 20° are limit values. Thus, the use of the guide pads 1 according to the present invention improves the deviation amounts by approximately 13° and 9°, respectively, compared to the related art. The experimental results of drilling the steel material S45C show the aforementioned effect of accuracy improvement in the machining hole diameter by approximately 30%.

Specifically, the drill with the diameter of 50.0 mm and whole length of 370 mm was attached to a vertical machining center, and a carbon steel S45C (220 HB) was used as the work material. The cutting speed Vc=150 m/min, feed f=0.10 mm/rev, and the depth of the machining hole of 150 mm were set as the conditions for cutting, and coolant was supplied through the inside of the drill. The drill having the guide pad 1 according to the embodiment attached thereto, the drill having the conventional guide pad attached thereto, and the drill without the guide pad were used to machine the work materials to drill 12 holes, respectively. Each variation in the diameter of the machined holes in the respective cases was evaluated. The variation in the machining hole diameters by the drill having the guide pad 1 according to the embodiment attached thereto resulted in approximately 0.12 mm as the difference in the diameter of the hole between the area around the inlet part and the area at the deep part. Meanwhile, the difference generated when using the drill without the guide pad resulted in approximately 0.24 mm, and the difference generated when using the drill having the conventional guide pad attached thereto resulted in approximately 0.17 mm, respectively. The use of the drill having the guide pad according to the embodiment attached thereto improved the accuracy of the machining hole by approximately 30% (100× (0.17−0.12)/0.17) compared to the accuracy derived from the use of the drill with the conventional guide pad.

Second Embodiment

Figure 9:
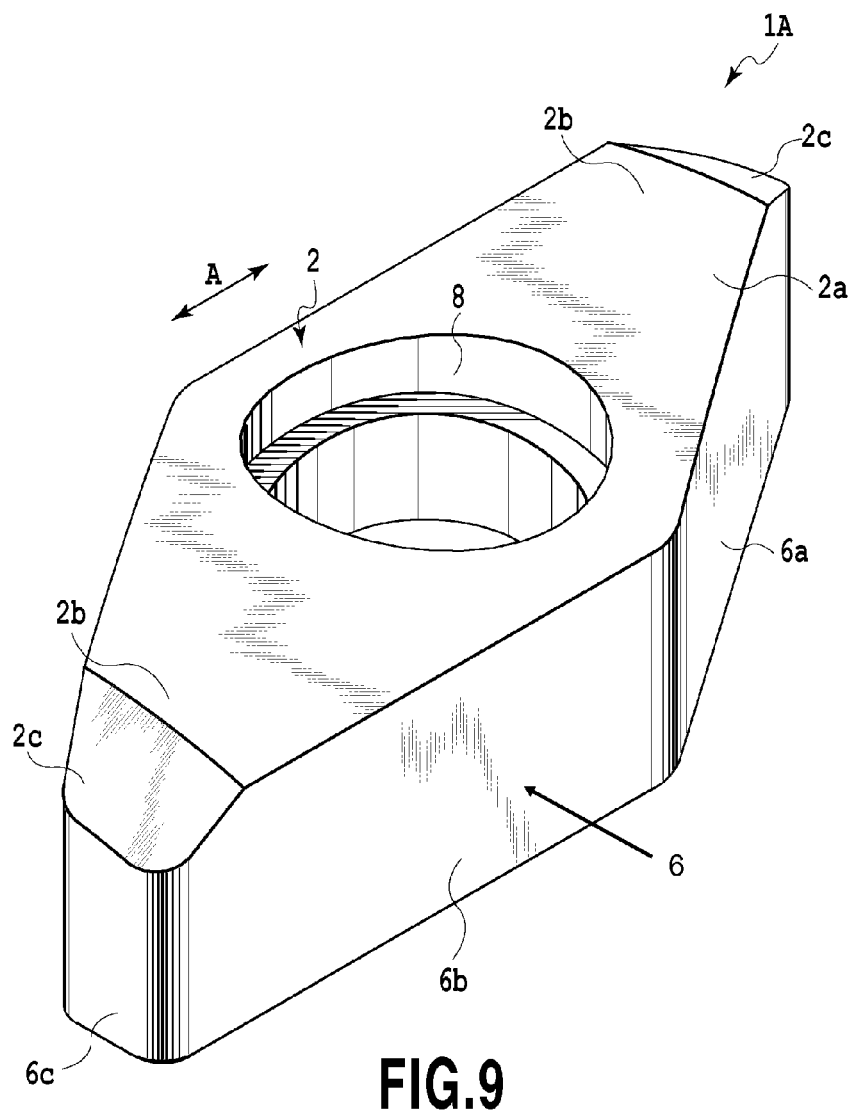
FIG. 9 is a perspective view of a guide pad according to a second embodiment.

Next, a guide pad 1A according to a second embodiment is shown in FIG. 9. The guide pad 1A of the second embodiment has a unitary guide surface 2a formed in the upper surface 2, the unitary guide surface 2a comprising a single section and being devoid of a longitudinally extending groove of the sort seen in the first embodiment. As described above, in spite of the unitary guide surface 2a, both ends 2b, 2b of the guide surface 2a in the longitudinal direction A are allowed to perform the guide function, independent of one another. Therefore, the two ends 2b, 2b of the guide surface 2a may be separately used by rotating the guide pad 1A at 180° with respect to the mounting hole 8. Preferably, the guide pad 1A according to the second embodiment is configured to have the central axis line C2 of the mounting hole 8 arranged offset with respect to the axis of rotation C3 of the cutting tool upon use of the guide pad 1A according to the second embodiment. When using one of the ends 2b of the guide surface 2a, the aforementioned arrangement secures sufficient clearance between the other end 2b and the inner wall surface of the machining hole. This may prevent damage of the other end 2b.

Third Embodiment

Figure 10:
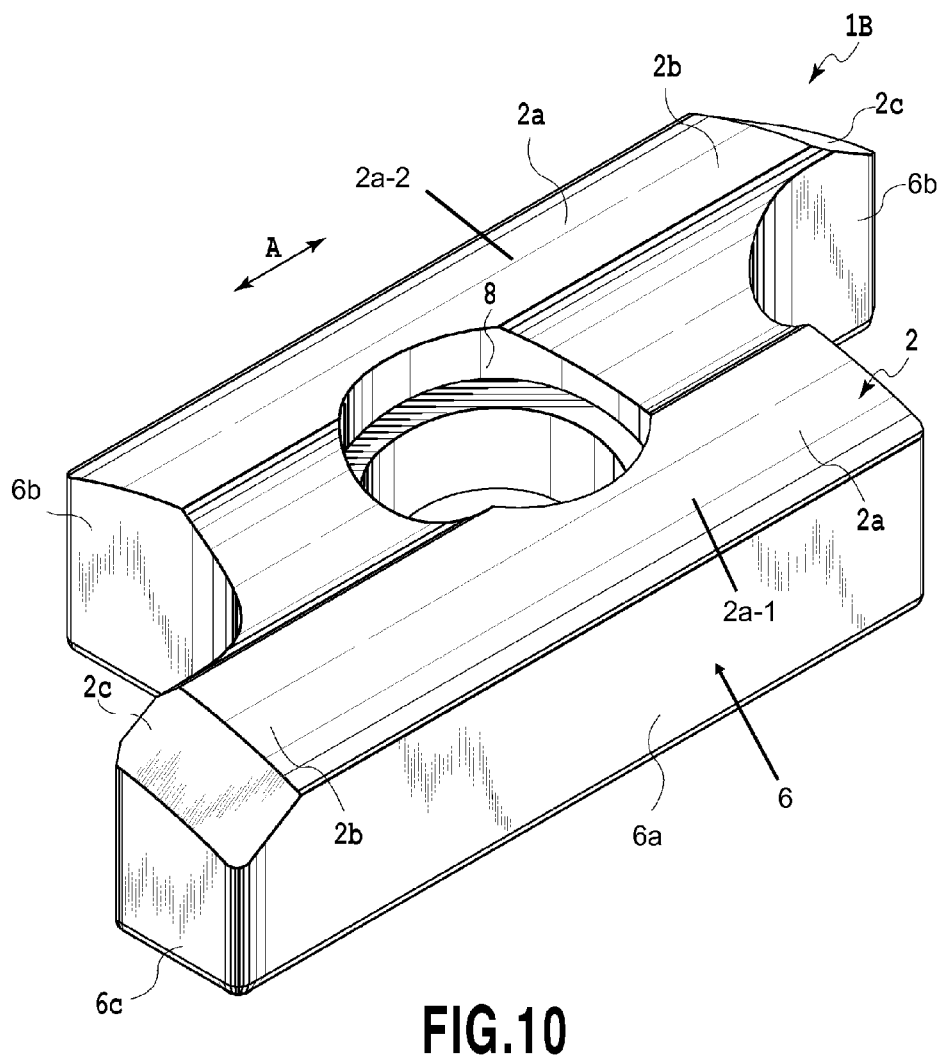
FIG. 10 is a perspective view of a guide pad according to a third embodiment.

A guide pad 1B according to a third embodiment is shown in FIGS. 10 and 11. Each external shape of the upper surface 2 and the lower surface 3 of the guide pad 1B is not substantially parallelogrammatic since the connecting side surfaces 6b, 6b are curved rather than being straight, in the plan view. The guide pad 1B is formed to have a width of the guide surface 2a at the end 2b on the side of the chamfer 2c smaller than that of the area around the mounting hole 8, and is formed asymmetrical with respect to the reference plane S. As in the first embodiment, the guide surface comprises two guide surface sections 2-a1, 2a-2 separated by a longitudinally extending groove 2d. As seen in FIG. 11 of the third embodiment, the guide surface 2a is not minor-symmetric with respect to either the reference plane S or the transverse plane T, though the guide surface has 180° rotational symmetry about the intersection (designated by central axis line C2) of the reference plane S and the transverse plane T.

In the third embodiment, along the longitudinal direction, the width of the guide pad 1B changes nonlinearly from the maximum width L2 of the area around which the mounting hole 8 is formed, to the minimum width L1 at the both ends 2b. Although not shown, it may be designed to have the width increased to the one larger than the width L2, and then decreased to the width L2 again. It may be freely adjusted within the range so as not to be interfered with the other components of the cutting tool.

According to the embodiment, because the number of allowed usage is set to two, the number of the guide surface components 2a-1, 2a-2 is set to two, but, which is not limited to such value. For example, if the number of the allowed usage is set to three or more, three or more guide surface components may be provided accordingly.

In the third embodiment, the two opposing major side surfaces 6a, 6a are parallel with each other, which is not limited thereto. Two major side surfaces may be arranged in non-parallel, or have curved surfaces each with the different shape. That is, in the embodiment, although each of the plurality of side surfaces is a planar surface, it is not limited thereto. They may have further complicated curved surfaces in order to prevent the interference with the other components of the cutting tool. For example, the side surface may be configured to have a single annular curved surface formed by smoothly connecting a plurality of curved surfaces. In the embodiment, the guide pad 1B has the width L1 that becomes relatively wide at the area around which the mounting hole 8 is formed, and the width L2 that becomes relatively narrow at both ends, which is not limited thereto. The width of the guide pad 1B at the area around the guide surface may be narrower than that of the area around the mounting hole, and the change in the width in the longitudinal direction may be arbitrarily set.

The conventional guide pad manufacturing method may be directly used for the method of manufacturing the guide pad according to the present invention. For example, manufacturing is conducted through the conventional manufacturing steps using the powder-pressurizing molding and sintering. The grinding work of the guide surface 2a, the chamfer 2c or the like may be added if needed. Furthermore, it may be subjected to the surface treatment such as coating of the hard coated layer through CVD or PVD if necessary. Various types of conventional techniques may be applied to all the manufacturing steps.

The indexable drill is the typical example as the cutting tool that allows removable attachment of the guide pad according to the present invention. Alternatively, attachment to the cutting tool for drilling, especially for deep hole drilling, such as the gun drill and reamer is effective. However, it is not limited to those tools as described above. It is applicable to all kinds of cutting tools which use the guide pad.

As described above, if the rotary cutting tool is employed as the cutting tool to which the guide pad 1 according to the present invention is removably attached, preferably, the guide pad is arranged so as to prevent the central axis line C2 of the mounting hole 8 from intersecting the axis of rotation C3 of the cutting tool. The position at which the guide pad is attached to the tool body 10 is set to establish the aforementioned arrangement. This allows each of the two or more ends 2b of the guide surface 2a to operate reliably, thus preventing damage of the other ends.

The cutting tool to which the guide pad according to the present invention is removably attached is removably attached to the machine tool such as the machining center and lathe, receives the relative rotating motion around the rotary axis of the tool, and the relative motion with respect to the work material so that the work material such as the steel material is subjected to the cutting process.

If the cutting tool is a drill, the guide pad is brought into contact with the inner surface of the hole drilled by the cutting tool itself and supported (guided) thereby to improve working precision of the hole to be machined. The guide pad and the cutting tool according to the present invention may be used in the machine tool such as the drill press. The guide pad according to the present invention is especially effective when it is attached to the rotary cutting tool with a single cutting edge.

Meanwhile, the cutting tool for drilling having two-cutting-edges or four-cutting-edges has another cutting edge at the approximately 180° position in the relative rotating direction of the tool from a first cutting edge. In such a case, the preferable position at which the guide pad is provided becomes different. In case of the two-cutting-edge type, for example, it is preferable to arrange the guide pads at the approximately 90° positions from the respective cutting edges. In case of the four-cutting-edge type, it is preferable to arrange the guide pads at the approximately 45° positions from the respective cutting edges. If it is difficult to arrange the four cutting edges (cutting inserts) and the four guide pads 1, a rough blade with a roughing cutting edge different from the other remaining cutting edges is provided among the four cutting edges. Then the guide pads are arranged at two positions, respectively, that is, the 180° positions in the relative rotating direction of the tool with reference to the roughing cutting edge, and the 90° positions backward in the relative rotating direction of the tool from the roughing cutting edge, respectively. There is little restriction with respect to arrangement of the guide pad according to the present invention. Therefore, it is applicable to the cutting tool with two or more cutting edges for drilling.

The present invention is not limited to the embodiments as described above, but may allow appropriate change, addition and omission of the structure without departing from the gist of the present invention. For example, it may have a recess portion for fastening so as to be engaged with the head of the clamp screw without using the mounting hole so as to be attached to the cutting tool (not shown) while providing the same effects as those derived from the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A guide pad having a plate-like shape and being removably attachable to a tool body of a cutting tool, comprising:
   opposite upper and lower surfaces;
   a central axis line (C2) passing between the upper and lower surfaces, and around which the guide pad has 180° rotational symmetry; and
   a side surface extending between the upper surface and the lower surface, wherein
   the upper surface comprises at least one guide surface that extends in a longitudinal direction (A) of the guide pad and curves convexly;
   the at least one guide surface has a curvature radius (R) centered about an axis line (C1) which extends in the longitudinal direction (A) and intersects the central axis line (C2);
   a reference plane (S) containing both the central axis line (C2) and the axis line (C1) extends parallel to the longitudinal direction (A), and is spaced apart from both longitudinal ends of the upper surface, in a width direction of the guide pad; and
   the upper and lower surfaces have left-right asymmetrical external shapes, respectively.

2. The guide pad according to claim 1, wherein widths of the upper and lower surfaces taken in a direction orthogonal to the longitudinal direction change in the longitudinal direction.

3. The guide pad according to claim 1, further comprising a mounting hole that penetrates the upper and lower surfaces, wherein
   the guide pad is formed 180° rotationally symmetric with respect to a center of the mounting hole.

4. The guide pad according to claim 1, wherein external shapes of the upper and lower surfaces, in plan views thereof, have a substantially parallelogram shape.

5. The guide pad according to claim 4, wherein the substantially parallelogram shape has a truncated acute-angled corner.

6. The guide pad according to claim 1, wherein the at least one guide surface comprises first and second guide surface sections formed separately from each other in a direction orthogonal to the longitudinal direction.

7. The guide pad according to claim 1, wherein a guide pad body thereof is formed only of one from the group consisting of cemented carbide, cermet and ceramic.

8. The guide pad according to claim 7, wherein a hard coating is coated on a surface of the guide pad body.

9. A cutting tool body comprising a pad seat configured to receive the guide pad according to claim 1.

10. A cutting tool comprising:
the guide pad according to claim 1; and
a tool body to which the guide pad is attached.

11. The cutting tool according to claim 10, wherein
the cutting tool is a rotary cutting tool for drilling;
the tool body has an axis of rotation;
the guide pad further comprises a mounting hole that penetrates the upper and lower surfaces; and
a central axis line of the guide pad's mounting hole is offset with respect to the tool body's axis of rotation.

12. The guide pad according to claim 1, wherein
a width of a guide surface at each longitudinal end of the guide pad, corresponds to a width of the guide pad at said each longitudinal end.

13. A guide pad having a plate-like shape and being removably attachable to a tool body, the guide pad comprising:
opposite upper and lower surfaces which differ from one another;
a mounting hole passing through the upper and lower surfaces and having a central axis line (C2) around which the guide pad has 180° rotational symmetry;
a peripheral side surface extending between the upper surface and the lower surface, the peripheral side surface including at least two major side surfaces extending along a longitudinal direction (A), at least two laterally extending side surfaces which are shorter than the major side surfaces, and at least two connecting side surfaces connecting the major side surfaces with the laterally extending side surfaces;
a curved guide surface formed on the upper surface and extending along the longitudinal direction (A), the guide surface having a curvature radius (R) located on an axis line (C1) which extends in the longitudinal direction (A), the guide surface comprising two longitudinally extending guide surface sections separated by a longitudinally extending recess groove;
a reference plane (S) containing both the axis line (C1) and the central axis line (C2) and bisecting the guide surface; and
a transverse plane (T) intersecting both of the major side surfaces and perpendicular to the reference plane (S), the transverse plane (T) intersecting the reference plane (S at the central axis line (C2) about which the guide pad has 180° rotational symmetry; wherein
the guide surface is not mirror-symmetric with respect to either the reference plane (S) or the transverse plane (T), though the guide surface has 180° rotational symmetry about the intersection of the reference plane (S) and the transverse plane (T).

14. The guide pad according to claim 13, wherein the connecting surfaces are straight in a plan view of the guide pad.

15. The guide pad according to claim 13, wherein the connecting surfaces are curved in a plan view of the guide pad.

16. The guide pad according to claim 13, wherein the curvature radius (R) of the guide surface changes in the longitudinal direction (A).

17. The guide pad according to claim 13, wherein the curvature radius (R) changes as a function of an angle (a) about the axis line (C), so that a curvature of the guide surface changes in accordance with distance from the reference plane (S).

18. A cutting tool body comprising a pad seat configured to receive the guide pad according to claim 13.

19. A cutting tool comprising:
the guide pad according to claim 13; and
a tool body to which the guide pad is attached.

20. The cutting tool according to claim 19, wherein
the cutting tool is a rotary cutting tool for drilling;
the tool body has an axis of rotation; and
the central axis line (C2) of the guide pad's mounting hole is offset with respect to the tool body's axis of rotation.

\* \* \* \* \*